INVENTORS.
PER HARRY ELIAS CLAESSON
HARRY FREESE
BY
Richardson, David and Nordon
ATTORNEYS.

Oct. 30, 1956 P. H. E. CLAESSON ET AL 2,769,034

AUTOMATIC TELEPHONE EXCHANGES

Filed June 6, 1951 5 Sheets-Sheet 2

INVENTORS.
PER HARRY ELIAS CLAESSON
HARRY FREESE

BY
Richardson, David and Nordon
ATTORNEYS.

INVENTORS
PER HARRY ELIAS CLAESSON
HARRY FREESE

BY
Richardson, David and Nordon
ATTORNEYS.

Oct. 30, 1956 P. H. E. CLAESSON ET AL 2,769,034

AUTOMATIC TELEPHONE EXCHANGES

Filed June 6, 1951 5 Sheets-Sheet 4

INVENTORS
PER HARRY ELIAS CLAESSON
HARRY FREESE

BY
Richardson, David and Nordon
ATTORNEYS

INVENTORS
PER HARRY ELIAS CLAESSON
HARRY FREESE.

BY
Richardson, David and Nordon
ATTORNEYS.

United States Patent Office 2,769,034

Patented Oct. 30, 1956

2,769,034

AUTOMATIC TELEPHONE EXCHANGES

Per Harry Elias Claesson, Jakobsberg, and Harry Freese, Traneberg, Sweden

Application June 6, 1951, Serial No. 230,204

Claims priority, application Sweden February 20, 1945

12 Claims. (Cl. 179—18)

This application is a continuation-in-part of our co-pending application, Serial Number 647,868, filed February 15, 1946. The present invention relates to automatic telephone exchanges particularly to private telephone exchanges. Telephone intercommunication systems are known, in which the connection and disconnection of called subscribers, hereinafter referred to as B-subscribers, is effected by means of key switches at a main station, said switches effecting the connection and disconnection simply by breaking and closing the communication circuits at their contacts. In such systems one communication line from the main station to each of the connectable B-subscribers is used and for the event the main station shall be connected to two or more B-subscribers at the same time this may be effected simply by operating the corresponding switches.

It will be understood, that in the case of a comparably great number of B-subscribers and particularly if there are several main stations this type of exchange is not practically and economically favourable, and then private branch exchange systems having selectors and selectively connectable common link circuits are more advantageous. In such systems being equipped with designation signal sending storing and receiving means the interconnection of several called subscribers is not so readily obtainable as in the first-mentioned type of exchanges, and special means and circuit arrangements are required for meeting the requirement of conference facilities.

It is the main object of this invention to provide a telephone exchange of the last-mentioned kind, in which calling subscribers, hereinafter referred to as A-subscribers, are capable of establishing connections with two or more B-subscribers so as to effect a simultaneous interconnection of several subscribers for conference purposes.

The invention will be described in greater detail with reference to the annexed drawings showing a private exchange telephone system in which the invention has been embodied.

In the drawings:

Figure 1 shows a skeleton diagram of a system providing facilities for local outgoing and incoming calls.

Figure 2 shows an extension apparatus with the appertaining line and switching equipment.

Figure 3 shows a connecting circuit with means for the reception of selecting signals.

Figure 4 shows a register with means for identifying the selecting signals received, and Figure 5 shows a common relay-set adapted to connect a calling A-subscriber to a connecting link and to connect up the desired B-subscriber identified by the register.

Figure 1:
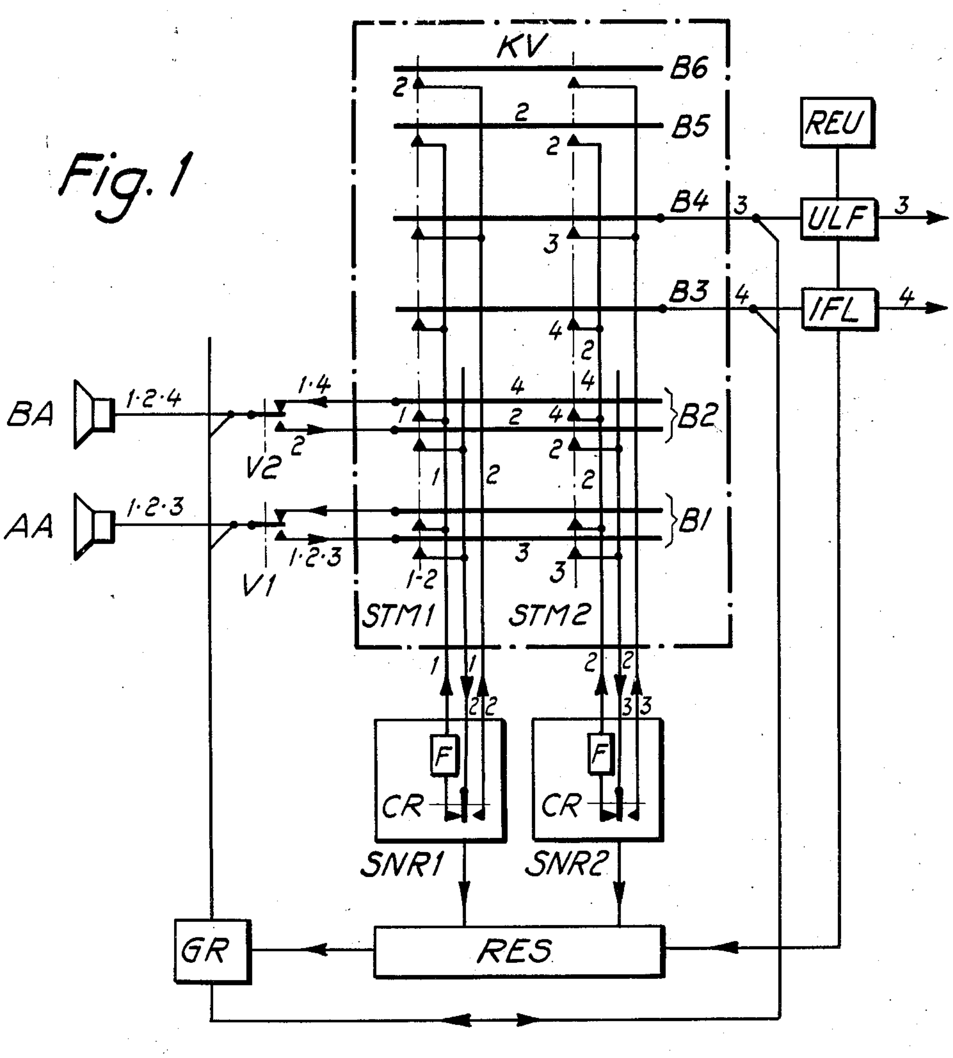
Figures 1 to 5 illustrate circuit diagrams.

*General description of the system shown in Figure 1*

Figure 1 is a skeleton diagram showing a local exchange provided with junction or trunk lines extending to another local exchange, a private exchange and so forth.

Here, the system is composed of cross bar switches KV so arranged that subscriber's and junction lines connected to the exchange are associated with the B-bars of the holding magnets, whereas the connecting links are marked by the selecting magnets STM1 and STM2, respectively. The holding magnets of the subscribers are utilized both for incoming and outgoing talking connections (symbolized by the fact that each such holding magnet has been drawn up with two horizontal lines), whereas the remaining holding magnets are in the present example only utilized for connections in the one direction. For the sake of simplicity there are shown in the drawing only two subscriber's stations AA and BA respectively having call or line relays V1 and V2 respectively, and two connecting links SNR1 and SNR2, respectively. Of the devices comprised in the connecting links only the change-over relays CR and the amplifier F are shown. There is a signal recorder RES common to all of the connecting links.

The outgoing junction line UFL is provided, according to the drawing, with a register REU. For incoming calls there is provided a junction line IFL. For setting up talking connections there is a relay-set GR common to the whole exchange.

Apparatus and switching means comprised in the system will be described more closely hereinafter. Here, only the function of the exchange will be broadly accounted for.

Upon a call from a subscriber station apparatus, such as AA, the call relay V1 operates. The common relay-set GR first searches the calling subscriber, and then searches an idle connecting link SNR1 and completes the talking connection by operating a selecting magnet STM1 corresponding to the connecting link seized and by energizing the holding magnet B1 of the calling subscriber. The A-subscriber is now connected to signal recording means over the relay V1 and the holding magnet. If a talking connection is desired with the subscriber BA, the A-subscriber depresses the corresponding push button, an individual button being provided at each station for every other station of the system. The transmitted selecting designation signal is received by the connecting link which is then connected to the register RES. The recorder identifies the selecting signal and effects, in cooperation with the common relays GR, the energizing of the holding magnet B2 of the B-subscriber, whereupon RES and GR are released for use by other subscriber stations. The talking connection set up obviously extends through the amplifier F of the connecting link in a talking circuit, which is designated in the skeleton diagram by the numeral 1. The severing of the talking connection may be effected in various ways, as will appear more fully from the detailed description hereinafter.

An outgoing talking connection (over the junction line UFL) is set up by the fact that the A-subscriber, on having been connected up to the connecting link, transmits a special selecting signal for such talking connections. In a similar manner as before, this causes a holding magnet such as B4 to be energized for an idle outgoing junction line UFL. In this case, the common relay-set GR will thus have to make a numerical group selection. The relay CR in the connecting link used is energized, as before, and cuts off the signal receiving part of the connecting link. Instead, signal receiving relays are provided in the relay-set REU of the junction line connected up. The selecting signals received here by REU may be constituted partly by such that are determined by a certain push button, and partly by such that are transmitted by a key-set, wherein each button or key corresponds to a certain numeral. In the latter case, any arbitrary combination of numerals may thus be set up. In both cases, the selecting signals may be converted by the register REU into impulse series, which are conveyed in the ordinary manner to the associated private exchange, central exchange, and so forth. Obviously, the extension apparatus may also be equipped with dials, in which case the register REU be omitted. For outgoing (as well as for incoming) calls, an ordinary microtelephone is supposed to be made us of at the extension apparatus, and consequently the talking connection will follow the circuit 3, for example, the amplifier being omitted from the connection.

Incoming calls, for instance from a private exchange, will enter into the relay-set IFL of the incoming junction line. This relay-set receives impulse series which are stored up until further notice in the relay-set. When the requisite number of impulse series have been received, the call is transferred to the exchange, connection to a disengaged connecting link being then effected in cooperation with the common relay-set GR. Thereupon marking impulses corresponding to the impulse series received are transmitted directly from IFL to RES, the latter then establishing connection to the desired B-subscriber in cooperation with GR. The talking connection will follow the circuit 4, for example.

It might be pointed out that the functions of the register RES and the common relay-set GR coincide in many cases, so that RES and GR may be combined.

*Detailed description of the system shown in Figures 2 to 5*

For the sake of simplicity, Figures 2 to 5 substantially comprise only the arrangement required for local talking connections according to the skeleton diagram in Figure 1.

Figure 2:
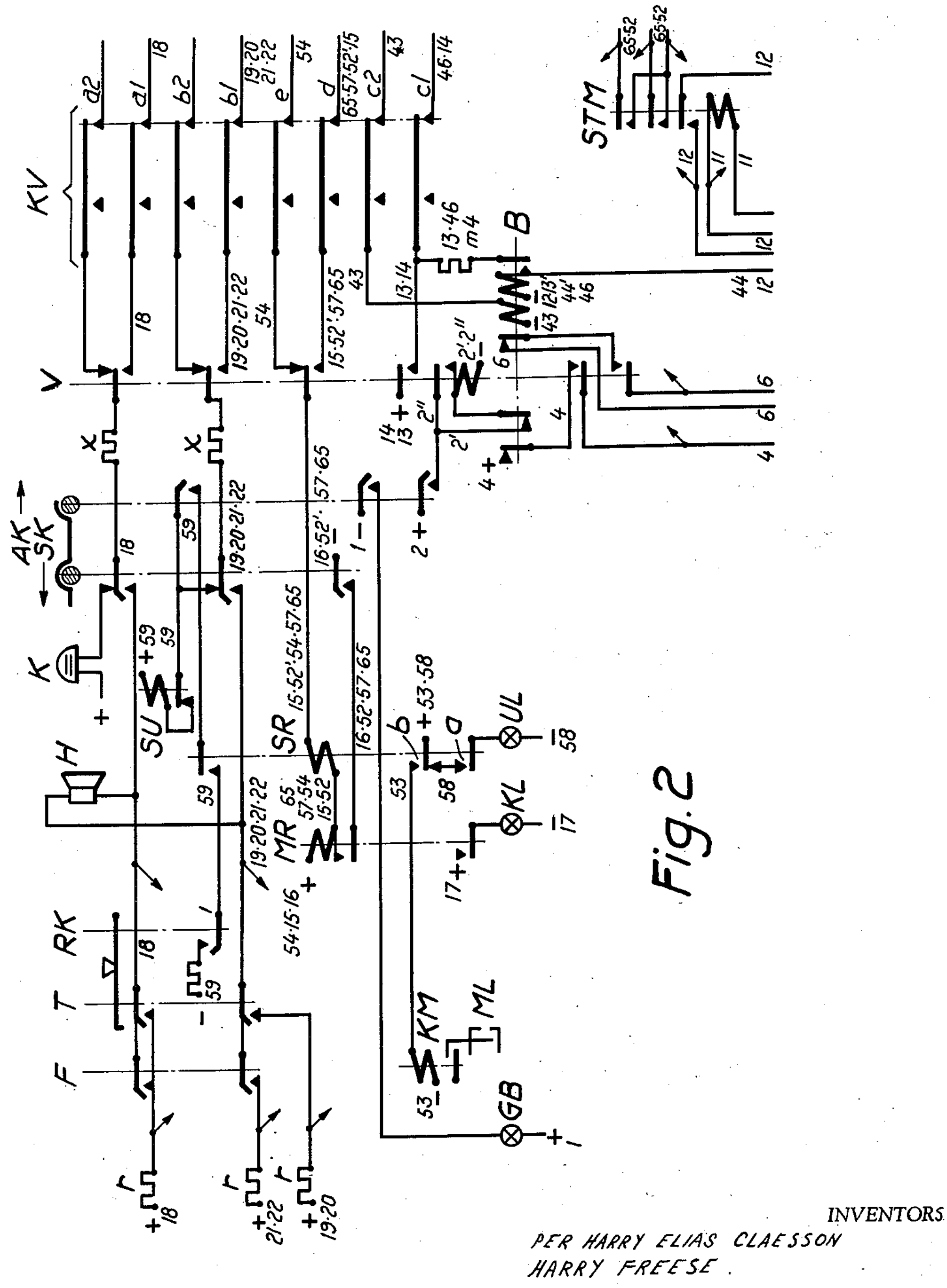

The extension or subscriber station apparatus shown in Figure 2 is provided with a loud speaker H, which also serves as a microphone. For calling, answering and restoring, there are provided three keys, shown in principle as a three-way switch for calling in the position AK, answering in the position SK, and restoring in the middle position. Furthermore, the restoring key is adapted mechanically to restore any depressed calling buttons at the extension apparatus. (This arrangement, like other mechanical means at the extension apparatus, will be explained hereinafter with reference to Figures 2 to 5.) For the establishment of the talking connections there are also a number of push buttons T each having an illuminated indicator ML associated therewith. For every push button there is provided a disconnecting key F for the severing of the talking connection set up.

The illuminated indicators comprise screens adapted to be operated by the common magnet KM in such manner that KM is caused to open the screen, if a push button T is kept depressed, and to close the same, if an F-key is kept depressed. Illumination means GB is provided in common to the screens. For the marking of connections to a connecting link there is provided a control lamp KL, and for a busy signal there is a busy lamp UL. These lamps and the magnet KM are operated by two relays MR and SR, the latter being a two-step relay adapted in the first position to actuate the closing contacts designated by *a*, and in the second position also to actuate the change-over contact denoted by *b* in addition to the closing contacts. The push buttons T may be locked in depressed position by means of a repeating key RK in the calling of an engaged subscriber. Finally, there are provided a buzzer SU and a bell K for acoustic signalling.

As switching means for establishing the talking connections the present example of embodiment shows cross bar switches, each of which has 10 holding bars, one for each subscriber, the connecting links being here allotted to a selecting bar in each cross bar switch. The number of cross bar switches consequently will be equal to the number of groups of 10 subscribers. The connecting links are multiplied over the multiple contacts in all holding bars in such manner that all subscribers are accessible from all of the ten connecting links. The number of subscribers should obviously be selected in dependence on the bulk of traffic which these ten connecting links are capable of handling.

Figure 3:
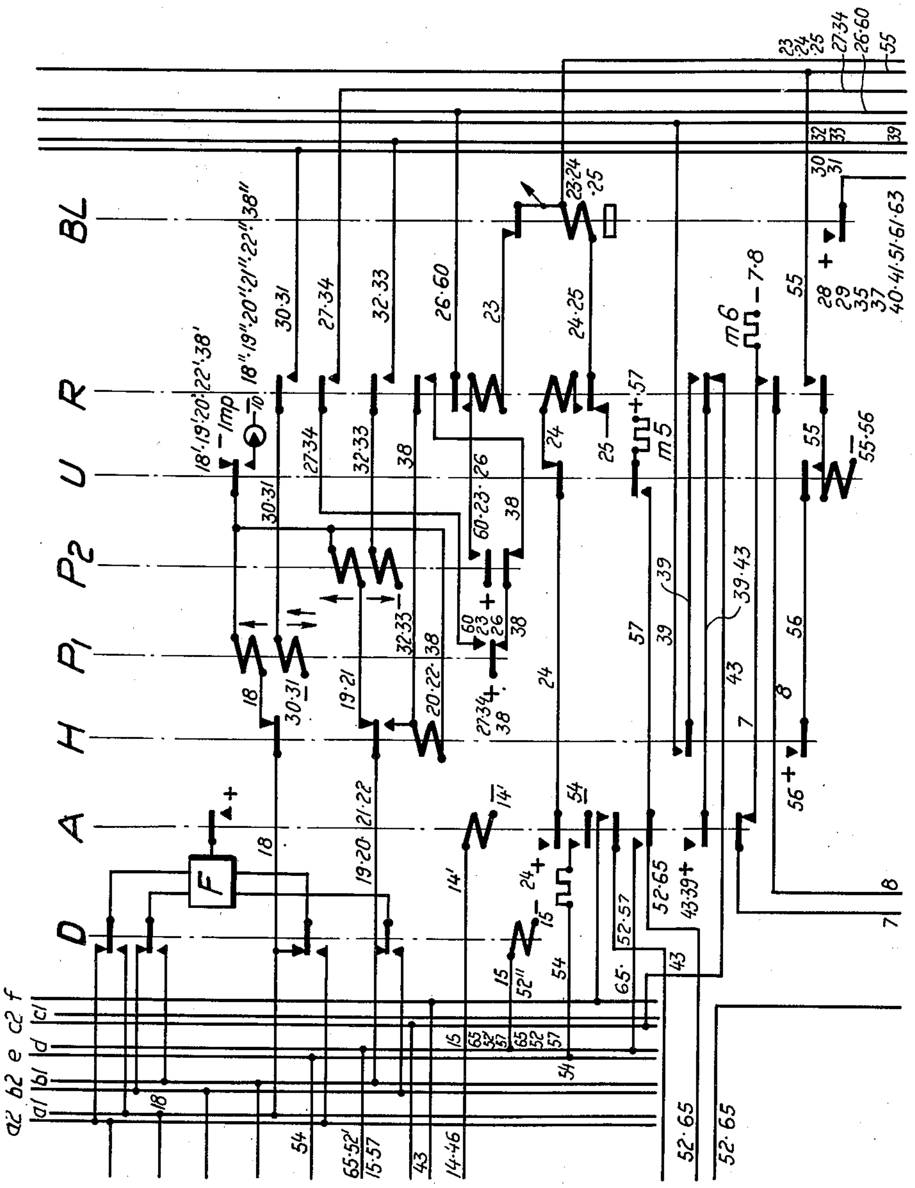

For the sake of simplicity, only one holding magnet B, Figure 2, and one connecting link, Figure 3, with the associated selecting magnet STM, Figure 2, have been drawn up.

Figure 5:
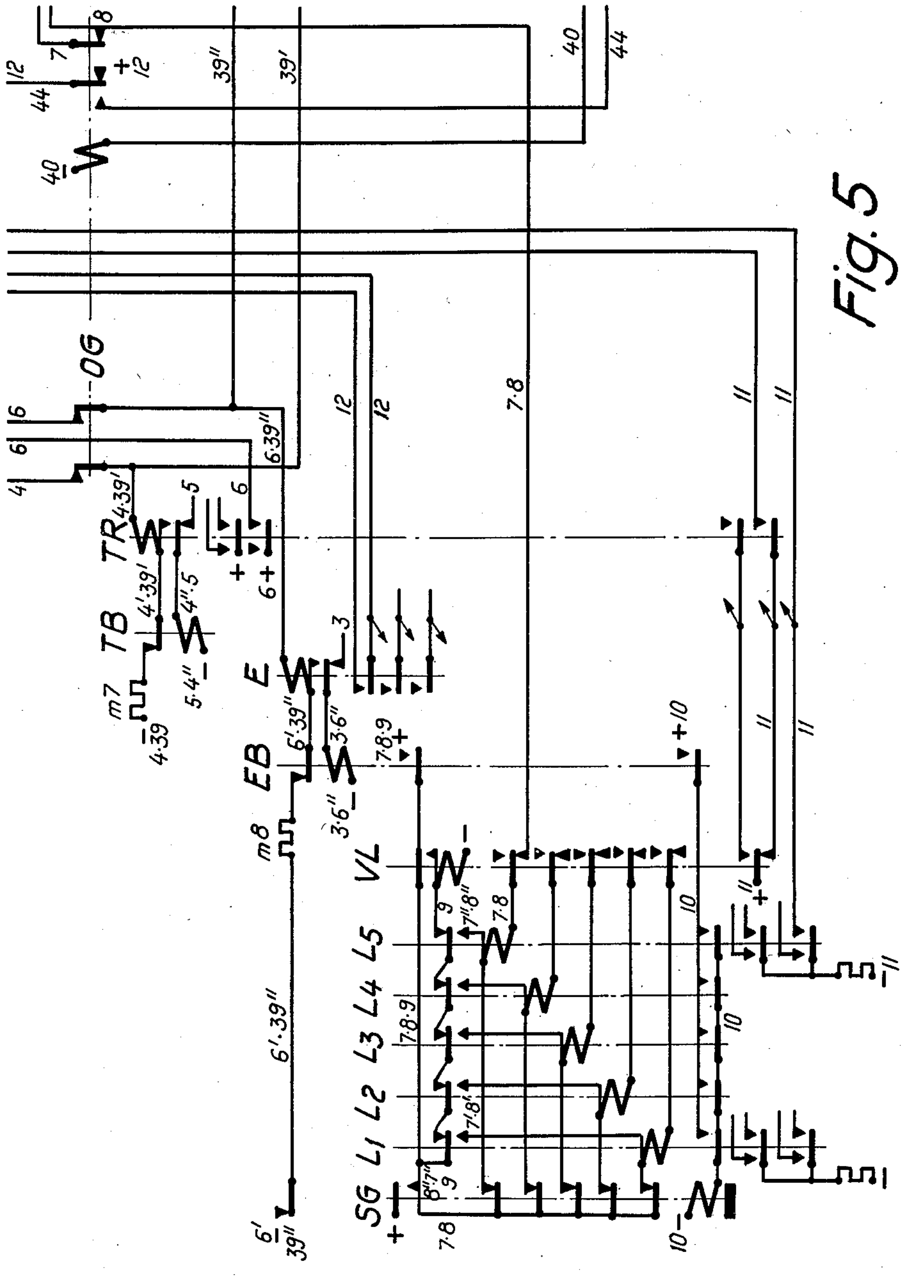

For the marking of a calling or a called subscriber the common relay-set, Figure 5, comprises a number of relays TR, one for each group of ten subscribers, and nine unit relays E, each of which is common to all subscribers having the same unit numeral. To prevent energizing of more than one TR- and E-relay respectively there are provided blocking relays TE and EB. Each subscriber also has a call relay V, Figure 2. The energizing current path of each TR-relay is multiplied over contacts on V-relays belonging to the same group of ten subscribers, that is to say, to the same cross bar switch. The energizing circuit of each E-relay is multiplied over contacts on all V-relays having the same unit numeral. These contacts are in turn connected to the plus pole by the TR-relays in such manner that all contacts pertaining to a group of ten V-relays are connected to the plus pole by a corresponding TR-relay. In addition to these energizing circuits, the TR- and E-relays may be energized over separate circuits from the part of the register adapted to identify the selecting signals. For the sake of simplicity, only one TR-relay and one E-relay are shown in the drawing.

The common relay-set also comprises an arrangement for the locating of an idle connecting link, said arrangement consisting of the test relays L1—L5, the change-over relay VL, and the blocking relay SG. Finally, there is a relay OG to prevent seeking at the moment when the register engages the common relay-set to set up a B-subscriber.

The connecting link, Figure 3, consists of a call relay A, two polarized relays P1 and P2 for the reception of selecting signals, one disconnecting relay H, one busy-relay U, one connecting relay R to make connection to the register, and an amplifier F. The change-over relay CR shown in Figure 1, which is not used in local talking connections, has been omitted for the sake of simplicity. The amplifier is provided with a relay O to show that change-over between speech and listening can be readily effected in case it is desired to devise the amplifier for one-way amplification. Operation of the relay O takes place over the *d*-wire, but for the sake of simplicity the corresponding change-over switch is not shown in the extension apparatus in Figure 2. Figure 3 also shows a blocking relay BL common to all connecting links, said relay preventing the connection of more than one connecting link at a time to the register.

Figure 4:
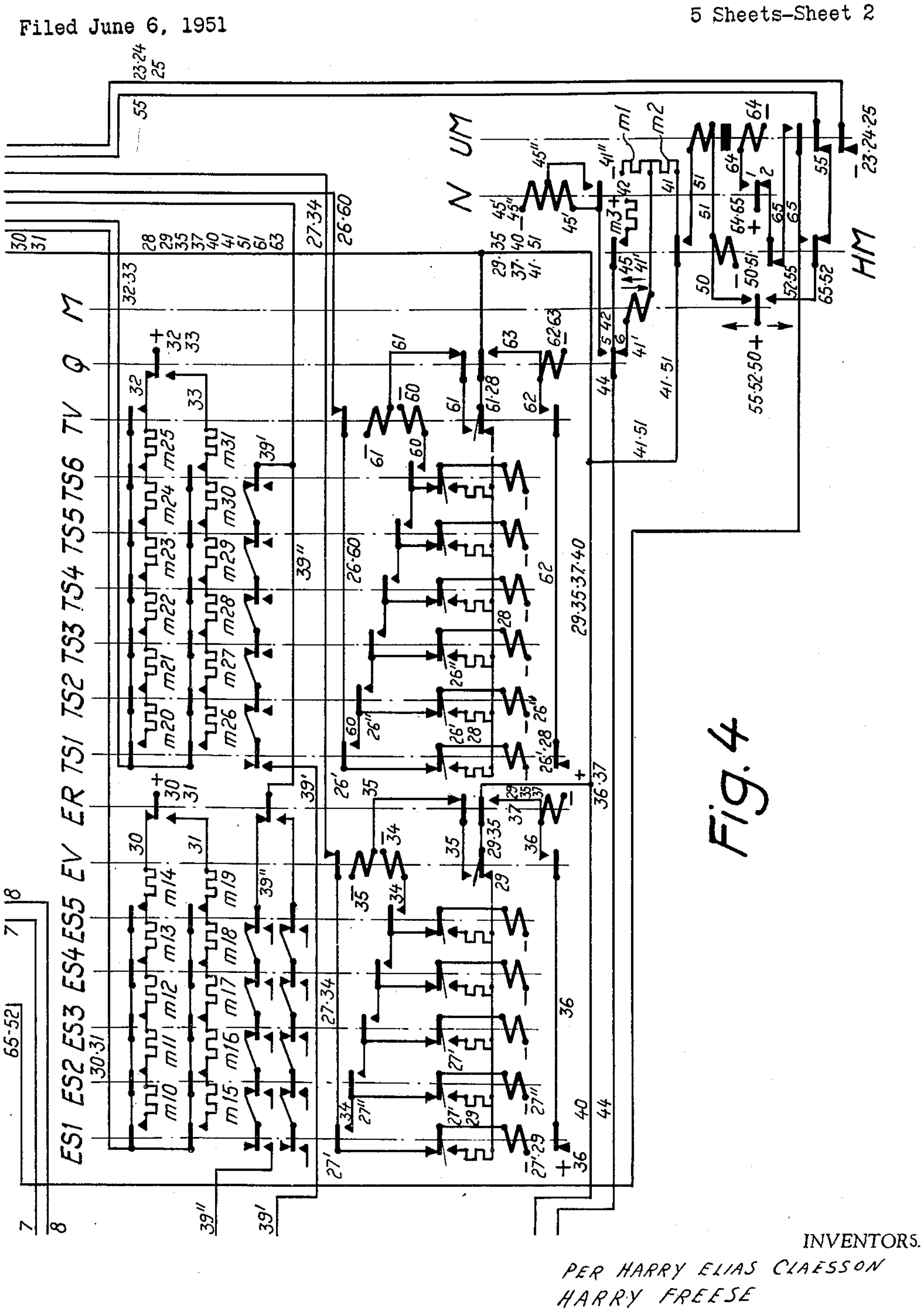

The register, Figure 4, consists of the selecting signal-receiving relays ES1—ES5 and TS1—TS6 with the appurtenant change-over relays EV and ER and TV and Q, respectively. Furthermore, there is a polarized relay M, which is devised with a middle position, the auxiliary relay HM, the break relay UM, and the clearing relay N.

*Setting up local talking connections*

The calling key AK (Figure 2) is depressed, all contacts shown in the change-over switch being thus actuated. Over the two change-over contacts the talking wires are switched over from the acoustic signalling means to the push buttons and the loud speaker. The common illumination GB is lighted in a circuit 1, while a circuit 2—2¹ is established at the same time through the winding of the relay V. This relay is energized, is held in a circuit 2—2¹¹, and establishes a circuit 4—4¹ through the winding of the relay TR corresponding to the energized relay V. The relay TR establishes a circuit 4—4¹¹ through the winding of the relay TB, which is energized so as to disconnect the resistance *m*7 shown from the circuit 4—4¹, besides which the other resistances *m*7, not shown, are disconnected from the energizing circuits of the remaining TR-relays. Furthermore, the holding circuit 5 for the remaining TR-relays has been interrupted over the changeover contact of the relay TR so as to prevent more than one TR-relay to be held.

A circuit $6-6^1$ is established over a contact of the relay TR through the winding of a unit relay E corresponding to the calling subscriber, and consequently this relay is energized so as to close the circuit $6-6^{11}$ through the winding of the relay EB. The relay EB is energized to break the circuit $6-6^1$ together with the energizing circuits of the other E-relays not shown. The holding circuit 3 of the remaining E-relays is interrupted over a contact of the relay E so as to prevent more than one E-relay from being held.

The calling subscriber is now univocally marked by means of the operating TR- and E-relays, and searching for an idle connecting link may commence. For the sake of simplicity it is assumed that only the connecting link shown in Figure 3 is disengaged, which is indicated by the fact that the test wire (circuit 7) is connected to the minus pole through the resistance *m6*. In this case, a circuit $7-7^1-7$ is established over a contact on the relay EB through the winding of the relay L5, which is energized. The relay L5 is held in the circuit $7-7^{11}-7$ and closes a circuit 10, whereby the relay SG is caused to operate. The latter relay opens the energizing circuits of all L-relays. Consequently, if a plurality of connecting links are marked as idle, only one L-relay can be held, whereas the other relays are deenergized immediately when the relay SG operates. If the five first connecting links are engaged, all of the relays (L1) to (L5) will release and the relay VL will obviously operate in a circuit 9, whereupon it is held over its make contact. (The relay VL is slower in its operation than the L-relays, and consequently it will not have time to operate, if any L-relay receives current at the same time.) The relay VL connects the remaining five connecting links for testing, whereupon testing can take place as explained above.

According to the example given, the relay L5 has been caused to operate, however, whereas the relay VL stays deenergized. The L-relay now assigns the connecting link sought, while the TR-relay indicates in which cross bar switch the called subscriber is to be found. The selecting magnet STM of the connecting link in this cross bar switch is energized over contacts on the relays L5 and TR in a circuit 11. The selecting magnet actuates its control contacts and causes energization of the corresponding multiple contacts of the holding magnet. Over a make on the selecting magnet and a make on the energized E-relay a circuit 12 is established through the right hand winding on the holding magnet B, which is energized and caused to be held through the same winding in a circuit 13, $13^1$. The circuit $4-4^{11}$ is opened over a control contact on the holding magnet, the relays TR and TB being thus deenergized, while the circuit 6, $6^{11}$ is opened over another contact on the holding magnet so as to release the relays E and EB. The circuit 11 is opened over a contact of the relay TR, whereby the selecting magnet STM is restored, the circuits $7-7^{11}-7$ and 10 being opened over a contact of the relay EB, whereby the relays L5 and SG are released. Now, the common relay-set is disengaged for any new call.

When the holding magnet B operates, the multiple contacts marked by the selecting magnet are closed, the calling subscriber being thus connected to the connecting link. A circuit $14-14^1$ is thus established through the call relay A of the connecting link, said relay being thus caused to operate so as to open the test circuit 7 of the connecting link. A special holding circuit 43 is closed over a contact of the relay A through the left winding of the holding magnet. When the holding magnet was energized, a further circuit 15 was also established through the windings of the relays O, SR and MR. The relays O and SR are not influenced by this current, whereas the relay MR is caused to operate. This relay is held in a circuit 16, the circuit 15 being thus short-circuited beginning from the relay SR. The relay MR lights the control lamp KL in the circuit 17 to indicate that a connection has been obtained to a connecting link.

The subscriber may now connect himself to another extension station by depressing a corresponding push button T. In the present example, the transmission of the selecting signals or criterion is effected by the sending of currents over the *a*1- and *b*1-wires, where a certain current strength constitutes a definite criterion. These currents energize the polarized reception relays P1 and P2, which then bring about the connection to the register. The signal identifying relays ES1—ES5 and TS1—TS6 of the register send a step-by-step increasing current into the counteracting winding of the reception relays, and these relays are released when the currents in both windings become equal. The signal identifying relays are thus stopped in position corresponding directly to the selecting signals transmitted over the *a*1- and *b*1-wires. The register then effects the setting up to the desired B-subscriber in a manner to be described hereinafter, whereupon it is cleared immediately. The various signal-defining resistances are preferably selected so that such "stops" are made between the various resistances that with given tolerances for the resistances approximately the same safety margin for the currents will be obtained. Due regard is paid here to the variation of the subscriber's line and of the resistances with the temperature. The connecting procedure will be described in detail in the following.

The subscriber depresses a push button T. Two circuits 18, $18^1$ and 19, $19^1$ are closed over contacts on the push buton through the energizing windings of the polarized relays P1 and P2. The resistances *x* incorporated in the talking wires are provided to equalize the different line resistances existing in the various subscriber's lines. The relays P1 and P2 are energized over said circuits, the relay P2 then causing the relay R to operate, which receives current through its upper winding in a circuit 23. The relay R receives holding current through its lower winding in series with the winding of the relay BL in a circuit 24. The relay BL is thus caused to operate so as to open the energizing circuits of the R-relays of all connecting links (for the own connecting link the circuit 23 is opened). Through a change-over of the relay R the holding circuit 25 is also opened for the remaining R-relays so as to prevent more than one R-relay from being in operation at the same time. The relay BL closes a circuit 40 through the relay OG, which is caused to operate so as to prevent searching in the common-relay-set by opening the energizing circuits of all TR- and E-relays. The circuits 4 and 6 are thus opened for the two relays shown.

The relay P1 starts the relays ES, the relay ES1 being then the first to receive current in a circuit 27, $27^1$. The relay ES1 is caused to operate and is held in a circuit 29, the same then opening the energizing circuit $27-27^1$ and closing instead a circuit $27-27^{11}$ through the relay ES2. This relay is energized and caused to be held and closes a circuit through the relay ES3, and so forth. When energized the relay ES1 closed a circuit 30 through the resistances *m*14—*m*10 and the counteracting (lower) winding of the relay P1. According as the relays ES2—ES5 are energized, the current strength is increased in this circuit by the fact that the resistances *m*10—*m*13 are short-circuited in due order. If the relay P1 is still operative when the relay ES5 has been energized, a circuit 34 is established through the lower winding of the relay EV, which is energized and held through its upper winding in a circuit 35. Through the operation of the relay EV the energizing circuit 27 of the ES-relays is kept open, and by the maintenance of the change-over the holding circuits $29-27^1$, $29-27^{11}$ etc. of the ES-relays are opened, these relays being consequently released. When the relay ES1 is released, a circuit 36 is established through the relay ER, which is energized and caused to be held in a circuit 37. The holding circuit 35 of the relay EV is thus opened, so that this relay is released and closes the holding and energizing circuits of the ES-relays anew. These relays are then energized anew in the manner previously described.

When the relay ES1 is energized this time, a circuit 31 is closed through the resistances *m*19—*m*15 and the counteracting winding of the relay P1. Said resistances have together a smaller ohmic value than that of the resistance *m*14, and consequently the current through the counteracting winding is increased. The current is then further increased, when the relays ES2—ES5 are energized so as to short-circuit the resistances *m*15—*m*18 in due order. When the current in the counteracting winding of the relay P1 becomes equal to or perhaps somewhat stronger than the current in the energizing winding, the relay P1 is released, the energizing circuit 27 of the following ES-relays being thus opened. It will appear from the above that the five ES-relays shown can identify ten different selecting signals, which may then be transmitted to the common relay-set.

Simultaneously with the operation of the ES-relays, the relay P2 analogously started the relays TS, the relay TS1 being then energized in a circuit 26—$26^1$. Holding and further operation of the remaining TS-relays is effected in the same manner as regards the ES-relays. With the aid of the resistances *m*20—*m*25, a stepwise increasing current will be supplied to the counteracting winding of the relay P2 in a circuit 32 in a manner corresponding to that described with reference to the ES-relays. In the present example it is assumed, however, that only six different selecting signals are used in this wire (that is to say on the subscriber's B-wire) for the setting up of talking connections, by reason of which the relay P2 is compelled by its corresponding winding to be released so as to break the energizing circuit 26, before the relays TV and Q are actuated.

The selecting signals transmitted by T-buttons are now stored up in the register, for instance in the relays ES1 (in the first round) and TS1. After both relays P1 and P2 have been deenergized, a circuit 38—$38^1$ is closed through the relay H, which is caused to operate so as to be held to the T-button over the B1-wire in a circuit 20—$20^1$. The relay H breaks the circuits 18 and 19 and causes operation of the tens-relay TR corresponding to the received selecting signals, and of the unit relay E in the common relay-set, the relay TR energizing in a circuit 39—$39^{11}$. In the manner previously described, circuits $4^{11}$ and $6^{11}$ are closed by the relays TR and E respectively, by reason of which the relays TB and EB are also energized.

When the relay OG was caused to operate, the test circuits of all connecting links were interrupted, of which test circuits only the previously mentioned test circuit 7 is shown in the drawing. However, the connecting link, which is connected to the register, has a special marking circuit connected to the minus-pole. At the energization of the relay EB, the test relay corresponding to the connecting link used, in this case the relay L5 is therefore energized in a circuit 8—$8^1$—8. As before, the relay SG is also energized in the circuit 10, the relay L5 being then kept energized in a circuit 8—$8^{11}$—8.

Now the energized TR-relay indicates in which cross bar switches the called subscriber is to be found, while relay L5 indicates the connecting link which is used and, consequently, the selecting magnet to be energized, as well as that energized E-relay the unit numeral of which is possessed by the called subscriber, and thus the holding magnet which is to be energized. For the sake of simplicity, the connection to the extension staation shown in Figure 2 is set up, which extension station may in this case be that of a B-subscriber.

When the relay L5 is energized, the selecting magnet STM receives current in a circuit 11. The selecting magnet is energized and closes a circuit 41—$41^1$—44—$44^1$ through the right hand winding on the holding magnet B.

This circuit is shunted, beginning from the winding on the relay M, by the resistance *m*1 in the register. Because of this current, the polarized relay M is energized in such direction that the change-over contact of the relay is closed upwardly, whereas the holding magnet B is not actuated as yet. Over the contact of the relay M, a circuit 50 is closed through the relay HM, which is caused to operate. Hereby, the holding circuit comprising previously the holding magnet B, the relay M and the resistances *m*1 and *m*2, is supplemented by the resistance *m*3 in a circuit 42. The resistance *m*3 is so dimensioned that the relay M becomes currentless, whereas the holding magnet receives sufficient current to operate. The change-over contact of the relay M returns into the middle position, the relay HM then receiving holding current in a circuit 51 through the upper winding of the relay UM. By this current the relay UM is caused to operate.

When the holding magnet is energized, a holding circuit is closed with connection to the plus pole from the make contact of the V-relay of the A-subscriber over a multiple contact on the holding magnet of the A-subscriber, the *c*1-wire (corresponding to the circuit 14), a multiple contact on the holding magnet of the B-subscriber and the resistance *m*4 (corresponding to the circuit 46). Hereby, a circuit is closed again through the winding of the relay M, the current being directed oppositely, however, to the preceding one, by reason of which this relay is energized in such direction that the change-over contact is actuated downwardly so as to close a circuit 52—$52^1$ through the two-step-relay SR at the extension apparatus of the A-subscriber. This relay operates in the B-position, by reason of which the magnet KM receives current in the circuit 53. The A-subscriber still keeps his push button T depressed, and consequently the operation of the magnet results in that the indicator lamp pertaining to the T-button is lighted (the screening device is opened). Simultaneously with the previously mentioned circuit 52—$52^1$, a circuit 52—$52^{11}$ was also established through the winding of the relay O, which is energized. In this case, however, the relay O has no function to fulfill.

Through the energization of the holding magnet of the B-subscriber, his extension apparatus was connected to the connecting link used. A circuit 54 is this closed through the relays MR and SR of the B-subscriber. The relay SR is not actuated by this current, but relay MR is caused to operate so as to light the control lamp KL in the circuit 17, said control lamp serving as a call lamp in connection with incoming calls. At the same time an acoustic signal is transmitted from the buzzer SU and/or the bell K, which receives a steady or periodic current over the *b*2- and *a*2-wires from means in the connecting link not shown in the drawing. The B-subscriber answers the call by depressing his answering button SK, only the contacts shown in the left hand portion of the switch being then actuated. The relay MR of the B-subscriber is held in the circuit 16, the circuit 54 being thus short-circuited beginning from the winding of relay SR. Furthermore, the acoustic signalling means are switched off, while the talking wires are switched over to the loudspeaker H. The talking connection is thus established from the A-subscriber over the *a*1- and *b*1-wires, the amplifier F of the connecting link, and the *a*2- and *b*2-wires to the B-subscriber. As previously stated, the relay UM of the register was energized in a circuit 51. The relay UM breaks the circuit 24, the relays R and BL being thus deenergized. Over contacts of the relay R, the circuits 8 and 39 are opened, by reason of which the relays L1, TR, E, EB and SG in the common relay set and thus also the selecting magnet STM, the relay O of the connecting link and the relay SR of the A-subscriber are restored. Over the make contact of the relay BL, the holding current for all energized relays of the register and for the relay OG in the connecting link is interrupted, and consequently these relays are also deenergized. After that, the register and the common relay set are ready to be used anew.

When the A-subscriber releases the push button T, the holding current for relay H (the circuit 20—20[1]) is interrupted, this relay being thus de-energized, the relay position becoming thus identical to that prevailing before the T-button was depressed. Consequently, the A-subscriber may establish connection with an arbitrary number of B-subscribers by depressing different T-buttons, every B-subscriber being thus marked at the extension apparatus of the A-subscriber by the lighting of the respective indicator lamp.

*The B-subscriber is engaged*

The connection is set up in the same way as in the preceding case so far that a circuit 44 is closed from the register to the right hand winding of the holding magnet B. In this case, this magnet is energized, by reason of which the previously mentioned holding circuit with the resistances *m*1 and *m*2, the relay M and the holding magnet is supplemented already from the beginning by the resistance *m*4 switched in over the holding contact of the holding magnet, said resistance being connected to the plus pole from a contact of a V-relay, either directly or over the cross bar switch and the *c*1-wire, depending on whether the called subscriber is engaged by an outgoing or an incoming talking connection. The current from the resistance *m*4 causes, as in the previously described case, the relay M of the register to be energized so as to close its switchover contact downwardly. In this case, the relay HM has not been energized, and consequently the busy relay U in the connecting link is caused to operate in a circuit 55. The relay U is held in a circuit 56 and closes a circuit 57 through the relay SR at the extension apparatus of the A-subscriber. Because of this current the relay SR is caused to operate in the A-position so as to light the busy-lamp UL in the circuit 58. When the relay U is energized, the circuit 24 is also opened, and consequently the relays R and BL are deenergized. Hereby the register and the common relay-set are restored as in the preceding case. Through the change-over of the relay U, the holding circuit of the relay H is switched over from constant minus to a minus circuit, which is periodically interrupted, for instance once every tenth second.

When the busy-lamp UL is lighted, the A-subscriber releases the depressed T-button, the relay H being thus deenergized (the circuit 20—20[11] being opened). Over a contact of the relay H, the circuit 56 is opened through the winding of the relay U, which is deenergized so as to open the circuit 57 through the relay SR of the A-subscriber. The relay SR is deenergized so as to interrupt the current through the busy lamp UL (the circuit 58), after which the relay position equals that which prevailed before the T-button was depressed.

The engaged B-subscriber can, if desired, be placed under suspension, connection being obtained, as soon as the subscriber becomes disengaged. In this case, the repeating switch RK is first actuated, whereupon the T-button of the B-subscriber is depressed. The T-button is thus locked in a manner appearing more closely from the description hereinafter of the mechanical construction of the extension apparatus. The setting-up is effected in accordance with the description hereinbefore. If the B-subscriber is still engaged, the relay U is therefore energized while the busy-lamp UL is lighted. The holding circuit of the relay B is connected, as before, to a periodically opened minus circuit. When the circuit is opened, the relay H is deenergized, the relay U being then also deenergized, as before, in addition to which the relay SR is restored and the busy lamp extinguished. Through the changeover of the relay U, constant minus is connected to the energizing circuit of the relays P1 and P2, by reason of which a call is effected anew. As long as the B-subscriber is engaged, this cycle of operations is repeated, the busy-lamp being thus put out for a short while at every repeated call.

When the B-subscriber becomes disengaged, the next following call will cause a connection to be set up in the manner previously described relative to the calling of a disengaged subscriber. When the two-step relay SR at the extension apparatus of the A-subscriber is energized in this case, a circuit 59 is closed through the buzzer SU. Hereby a short acoustic signal is transmitted to the A-subscriber, while the indicator lamp corresponding to the depressed T-button is lighted at the same time in the manner previously described. The relays are then restored as previously described, the acoustic signal of the A-subscriber ceasing when the relay SR is deenergized. The repeating switch is returned to the initial position (if desired this may be caused automatically by the energization of the connecting magnet KM), whereby the depressed T-button is restored. The position is then the same as upon the setting up of the connection to a disengaged B-subscriber, as previously described.

*Disconnecting a B-subscriber*

As previously pointed out, a talking connection may be established to a number of B-subscribers simultaneously. These may be disconnected in an arbitrary sequence by means of special disconnecting buttons F, one for every T-button. The F-buttons transmit special selecting signals received in the register, in a manner such that the holding magnet indicated by the selecting signal is restored. Hereby, the talking connection is interrupted, and the disconnected B-subscriber becomes disengaged for another talking connection. A detailed description of the connecting procedure follows hereinafter.

The A-subscriber depresses a disconnecting button F. Hereby the circuits 18—18[1] and 21—*a*1[1] are established, a call being mediated as previously described, in that the relays P1, P2 and R of the connecting link and the blocking relay BL and the relay OG of the common relay-set are caused to operate. In this example, the disconnecting signals are selected so that the signal on the *a*-wire (corresponding to the relays ES of the register) equals the corresponding signal on the T-button, whereas the signal on the *b*-wire (corresponding to the relays TS of the register) differs from the corresponding signal on the T-button in such manner that the change-over relays TV and Q of the register are actuated, and that the same TS-relay is then marked which corresponds to the signal of the T-button. The relays ES and TS will therefore be energized in the manner previously described, but in difference from the former case a circuit 60 will be established through the lower winding of the relay TV, which is energized and held through its upper winding in the circuit 61. Through the opening of the relay TV, the energizing circuit 26 of the TS-relays is maintained open, and through the continuous change-over the holding current of the TS-relays is interrupted, so that these relays are deenergized. When the relay TS1 is deenergized, a circuit 62 is established through the relay Q, which is energized and held in the circuit 63. The holding circuit 61 of the relay TV is thus opened, which relay is deenergized so as to switch in the holding and energizing circuits of the TS-relays anew. After that, these relays are energized anew in the manner previously described with reference to the TS-relays. When the relay TS1 is energized anew, a circuit 33 is closed through the resistances *m*31—*m*26 and the corresponding winding of the relay P2. The combined ohmic value of said resistances is less than that of the resistance *m*25, and consequently the current in the corresponding winding is further increased. When the current becomes equal in the two windings, the relay P2 is deenergized, so that the energizing current of the TS-relays is interrupted.

In the manner previously described in the setting up of a local talking connection, the energizing circuit of the holding magnet of the B-subscriber corresponding to the selecting signal received will be connected to the register in the circuit 44. In this case, however, the relay Q is energized, by reason of which the holding magnet, which received holding current of the plus-sign from a contact of the V-relay of the A-subscriber over the cross bar switch and the *c*1-wire through the resistance *m*4 (in the circuit 14—46), will be shunted to the relay N of the register in a circuit 44—45—45[1]. In this circuit the relay N is energized, the lower high-ohmic winding of this relay being thus short-circuited by the own make contact of the relay. The upper winding of the relay N is low-ohmic, and consequently the holding current through the right hand winding of the holding magnet is shunted down to such an extent that the holding magnet is released. If the marked B-subscriber is in conversation over another connecting link, the holding magnet receives holding current through its left hand winding in a circuit 43, by reason of which the holding magnet will not be actuated in this case. For a connecting link, however, which is connected to the register, this circuit is maintained open over a change-over contact of the relay R.

In the register, the relay N causes energization of the relay UM in the circuit 64 through the lower winding of UM. When the holding magnet is deenergized, the holding circuit 44—45—45[11] is opened through the relay N, and consequently this relay is deenergized. The relay UM is thus rendered currentless, but stays for a short while by reason of its slow action. Over the change-over contact of the relay N, a circuit 65 is therefore established through the relay SR at the extension apparatus of the A-subscriber. Through this current, the relay SR is energized in B-position and closes the circuit 53 through the magnet KM. The Q-subscriber still keeps the disconnecting button F depressed, and consequently the energization of KM will in this case result in that the corresponding screening device is closed, that is to say, the indicator lamp ML is put out.

When the relay UM of the register is energized, the circuit 24 is opened through the relays R and BL, the register and the common relay-set being thus restored in the manner previously described. When the A-subscriber releases the depressed F-button, the circuit 22—22[1] is opened, so that the relay H is also restored, whereupon the connecting link is prepared to receive further disconnecting or setting up signals, as in the cases previously described.

If the A-subscriber desires to terminate the conversation with all B-subscribers joined up, this is effected in the simplest way by depression of the restoring button. The contacts actuated by the call button AK are thus restored, and the circuits 1, 2—2[11] and 16 are opened, so that the common illumination GB is put out and the relays V and MR are released. Over a contact on the relay V, the circuits 13 and 14 are opened, and consequently the right hand windings of all holding magnets comprised in the talking connection become currentless, so that the relay A of the connecting link is released. Over a contact of the relay A, the holding circuit 43 of the left hand windings of the holding magnets is opened, and consequently all holding magnets are deenergized.

Over a contact of the relay MR, the circuit 17 is opened, the control lamp KL being consequently put out. The screening devices which are open at the restoring moment are closed by the restoring button, whereupon the extension apparatus is restored to the initial position so as to be disengaged for another talking connection.

Obviously, several details may be varied while substantially maintaining the principal operation described hereinbefore. For example, the same buttons may be used for the setting up of numerals as well as for direct connection. In this case a special selecting signal is to be sent for switching the set of buttons over from the one to the other kind of operation. This special selecting signal causes a change-over at the exchange, for instance the switching in of a key-set register, so that the desired function is obtained.

What we claim is:

1. In a telephone exchange system calling and called subscriber's stations, designation signal sending means at said calling subscriber's stations for sending various designation signals characteristic to different called subscriber's stations, subscriber's lines associated with said calling and called subscriber's stations, link circuits, switching means for connecting said link circuits to calling subscriber's lines for calls, signal recording means for recording designation signals sent by said designation signal sending means, said signal recording means being common to the link circuits, switching means associated with each link circuit and responsive to every designation signal sent by said designation signal sending means for connecting the signal recording means to the respective link circuit through the occurrence of any of said designation signals, switching means for connecting said link circuits selectively to said called subscriber's lines and means in said signal recording means for completing circuits in response to recorded designation signals for the selective operation of the last-mentioned switching means.

2. In a telephone exchange system calling and called subscriber's stations, designation signal sending means at said calling subscriber's stations for sending various designation signals characteristic to different called subscriber's stations, subscriber's lines associated with said calling and called subscriber's stations, link circuits, switching means for connecting said link circuits to calling subscriber's lines for calls, signal recording means for recording designation signals sent by said designation signal sending means, said signal recording means being common to the link circuits, switching means associated with each link circuit and responsive to every designation signal sent by said designation signal sending means for connecting the signal recording means to the respective link circuit, switching means for connecting the signal recording means to the respective link circuit, switching means for connecting said link circuits selectively to said called subscriber's lines and means in said signal recording means for completing circuits in response to recorded designation signals for the selective operation of the last mentioned switching means, said switching means associated with each link circuit for connecting the signal recording means to the respective link circuit being adapted to be operated in response to the operation of said means in said signal recording means for completing circuits in response to received designation signals so as to disconnect the signal recording means after said circuits have been completed.

3. In a telephone system calling and called subscriber's stations, subscriber's lines associated with the calling subscriber's stations and each including at least one line conductor, designation signal sending means at said calling subscriber's stations for sending various designation signals characteristic of different called subscriber's stations and each comprising key switches and standard circuit elements such as resistors connectable by said key switches in series with the said line conductor, link circuits, switching means for connecting said link circuits to calling subscriber's lines for calls, a current source for feeding with current said standard circuit elements, when connected by said key switches, in series with the respective link circuit and line conductor for the generation of designation signals each in the form of a characteristic current condition responding to the operation of a predetermined key switch, signal recording means for recording a designation signal transmitted by said designation signal sending means, said signal recording means being common to the link circuits and comprising means selectively responsive to the different current conditions forming said designation signals, switching means associated with each link circuit and including an operating winding connected to the respective circuit and biasing means to cause the switching means to be operated through each current condition responding to the operation of any of the key switches for connecting the signal recording means to the respective link circuit, called subscriber's lines, switching means for connecting said link circuits selectively to said called subscriber's lines and means in said signal recording means for completing circuits in response to recorded designation signals for the selective operation of the last mentioned switching means.

4. In a telephone system calling and called subscribers' stations, subscriber's lines associated with the calling subscriber's stations and each including at least one line conductor, designation signal sending means at said calling subscriber's stations each comprising key switches and standard circuit elements such as resistors connectable by said key switches in series with the said line conductor, link circuits, switching means for connecting said link circuits to calling subscriber's lines for calls, a current source for feeding current to said standard circuit elements, when connected by said key switches, in series with the respective link circuit and line conductor for the generation of designation signals each in the form of a characteristic current condition responding to the operation of a predetermined key switch, signal recording means for recording designation signals transmitted by said designation signal sending means, said signal recording means being common to the link circuits and comprising means selectively responsive to the different current conditions forming said designation signals, switching means associated with each link circuit and including an operating winding connected to the respective circuit and biasing means to cause the switching means to be operated through each current condition responding to the operation of any of the key switches for connecting the signal recording means to the respective link circuit, called subscriber's lines, switching means for connecting said link circuits selectively to said called subscriber's lines and means in said signal recording means for completing circuits in response to recorded designation signals for the selective operation of the last mentioned switching means, said switching means associated with each link circuit for connecting the signal recording means to the respective link circuit being adapted to be operated in response to the operation of said means in said signal recording means for completing circuits in response to received designation signals so as to disconnect the signal recording means after said circuits have been completed.

5. In a telephone system according to claim 4 a relay device adapted to be operated in response to the operation of said means in the signal recording means for completing circuits in response to received designation signals and to reset the said switching means for connecting the signal recording means to the respective link circuit, said relay device being provided with a holding circuit controlled by the operation of any of said key switches.

6. In a telephone exchange system calling and called subscriber's stations, designation signal sending means at said calling subscriber's stations for sending various designation signals characteristic to different called subscriber's stations, subscriber's lines associated with said calling and called subscriber's stations, link circuits, switching means for connecting said link circuits to calling subscriber's lines at calls, signal recording means for recording designation signals sent by said designation signal sending means, said signal recording means being common to the link circuits, switching means associated with each link circuit and responsive to every designation signal sent by said designation signal sending means for connecting the signal recordig meas to the respective link circuit, switching means for connecting said link circuits selectively to said called subscriber's lines, means in said signal recording means for completing circuits in response to recorded designation signals for the selective operation of the last-mentioned switching means, a testing device adapted to be operated in response to the busy or idle condition of the called subscriber's line, means for rendering said switching means inoperative to connect the respective link circuit to the respective subscriber's line, the latter being operable through the combined action of two circuits, one extending through the respective link circuit and said switching means for connecting the respective called subscriber's line and the other being controlled by said means in said signal recording means for completing circuits in response to recorded designation signals.

7. In a telephone exchange system incoming and outgoing lines, designation signal sending means associated with said incoming lies for sending a designation signal characteristic to an outgoing line, link circuits, switching means for connectng said link circuits to calling incoming lines, signal recording means for recording the designation signal sent by said designation signal sending means, said signal recording means being common to the link circuits, switching means associated with each link circuit and responsive to the said designation signal sent by said designation signal sending means for connecting the signal recording means to the respective link circuit through the occurrence of said designation signal, switching means for connecting said link circuits selectively to said outgoing lines and means in said signal recording means for completing a circuit in response to the recorded designation signal for the selective operation of the last mentioned switching means.

8. A telephone system comprising: a plurality of subscriber stations each station comprising a plurality of manually operable switch means, one manually operable switch means being provided for controlling connection of each station to each of the other stations of said system; a plurality of link circuits for interconnecting said stations; crossbar switch means for interconnecting any two of said subscriber stations through one of said link circuits; means common to all of said subscriber stations and connectable to said crossbar switch means, said common means including means responsive to a calling subscriber station for finding an idle one of said link circuits and means selectively controllable by operation of one of said manually operable switch means at said calling subscriber station for actuating said crossbar switch means to select successively any desired combination of the others of said subscriber stations for simultaneous connection to said calling station through one of said link circuits; and means responsive to completion of each connection for disconnecting said common means and making said common means available to a calling subscriber station.

9. A system according to claim 8, further comprising two-way amplifier means included in each of said link circuits and loudspeaker-microphone means at each of said subscriber stations.

10. A system according to claim 8, further comprising selectively operable means at each of said subscriber stations for releasing a link circuit connecting said calling station to a selected individual one of said others of said stations and means included in said common means and responsive to said selectively operable means for actuating said crossbar switch means to effect said release of said link circuit.

11. A telephone system comprising: a plurality of subscriber stations, each station having selectively operable resistance control means; crossbar switch means for interconnecting said stations; a plurality of line circuits each connecting one of said stations to said switch means, each line circuit including resistance means for equalizing the resistance of each line to a fixed predetermined nominal value; a plurality of link circuits connected to said switch means and each adapted to interconnect any two of said stations through said switch means; means common to all of said stations and connectable to said switch means, said common means including means responsive to a calling station for finding an idle one of said link circuits and connecting said calling station thereto, said common means including resistance responsive register means for actuating said switch means to connect said calling station through said found link circuit to another one of said stations selected by operation of said resistance control means, successive operations of said resistance control means being effective to connect said calling station simultaneously to a plurality of others of said stations through a corresponding plurality of said link circuits; means included in said common means and responsive to completion of said connection for disconnecting said common means from said switch means and selectively operable disconnecting means disposed at at least one of said stations, said disconnecting means including means to connect said resistance control means to the line circuit of said station in a manner distinct from the manner used for causing said register means to actuate said switch means to complete said connection, said register means comprising resistance responsive means actuable by said resistance control means when connected to said line circuit and in said distinct manner for effecting disconnection of said calling station from a selected one of said others of said stations.

12. A system according to claim 11, further comprising two-way amplifier means included in each link circuit and loudspeaker-microphone means at each of said subscriber stations.

References Cited in the file of this patent

UNITED STATES PATENTS

| | | |
|---|---|---|
| 1,761,115 | Gardner | June 3, 1930 |
| 1,882,106 | Wise | Oct. 11, 1932 |
| 2,185,287 | Beaumont | Jan. 2, 1940 |
| 2,227,488 | Collis | Jan. 7, 1941 |
| 2,332,912 | Hecht et al. | Oct. 26, 1943 |